US010685171B2

United States Patent
Lancioni et al.

(10) Patent No.: US 10,685,171 B2
(45) Date of Patent: Jun. 16, 2020

(54) STEGANOGRAPHIC ENCODING DETECTION AND REMEDIATION

(71) Applicant: McAfee, LLC, Santa Clara, CA (US)

(72) Inventors: German Lancioni, Santa Clara, CA (US); Jonathan B. King, Santa Clara, CA (US); Eric D. Wuehler, Santa Clara, CA (US)

(73) Assignee: McAfee, LLC, Santa Clara, CA (US)

( * ) Notice: Subject to any disclaimer, the term of this patent is extended or adjusted under 35 U.S.C. 154(b) by 201 days.

(21) Appl. No.: 15/885,141

(22) Filed: Jan. 31, 2018

(65) Prior Publication Data

US 2019/0236119 A1    Aug. 1, 2019

(51) Int. Cl.
| | |
|---|---|
| *G06F 17/00* | (2019.01) |
| *G06F 40/10* | (2020.01) |
| *G06F 21/00* | (2013.01) |
| *G06F 40/126* | (2020.01) |
| *G06F 21/60* | (2013.01) |
| *H04L 9/36* | (2006.01) |
| *G09C 5/00* | (2006.01) |
| *G06F 40/14* | (2020.01) |
| *G06F 40/163* | (2020.01) |

(52) U.S. Cl.
CPC .......... *G06F 40/126* (2020.01); *G06F 21/602* (2013.01); *G06F 40/14* (2020.01); *G06F 40/163* (2020.01); *G09C 5/00* (2013.01); *H04L 9/36* (2013.01)

(58) Field of Classification Search
CPC ........ G06F 21/10; G06F 21/572; G06F 21/71; G06F 21/725; G06F 2221/0737; G06F 17/2247
See application file for complete search history.

(56) References Cited

U.S. PATENT DOCUMENTS

| | | | |
|---|---|---|---|
| 10,339,103 B2* | 7/2019 | Boutnaru | G06F 21/6209 |
| 2003/0026447 A1* | 2/2003 | Fridrich | G06T 1/005 |
| | | | 382/100 |
| 2015/0047037 A1* | 2/2015 | Wood | G06F 21/55 |
| | | | 726/23 |

(Continued)

OTHER PUBLICATIONS

International Searching Authority, "International Search Report," issued in connection with application No. PCT/US2018/068060, dated Apr. 4, 2019, 4 pages.

(Continued)

*Primary Examiner* — Ariel Mercado
(74) *Attorney, Agent, or Firm* — Hanley, Flight & Zimmerman, LLC

(57) ABSTRACT

A steganographic coding detector (and method) analyzes one or more pages of a file. For each page containing text strings, the detector counts a number of A0h and 20h characters for the text string. For each text string for which the number of A0h characters is greater than a first threshold, the detector sets a flag to a first state, The first threshold is computed based on the number of 20h characters in that text string. For each text string for which the number of 20h characters is less than the first threshold, the detector sets the flag to a second state. Responsive to the number of text strings that have a flag at the first state being greater than a second threshold, the detector marks the file as being steganographically encoded.

19 Claims, 6 Drawing Sheets

(56) References Cited

U.S. PATENT DOCUMENTS

2016/0283746 A1* 9/2016 Boshoff .............. G06F 21/6263

OTHER PUBLICATIONS

International Searching Authority, "Written Opinion," issued in connection with application No. PCT/US2018/068060, dated Apr. 4, 2019, 7 pages.
Sui Xin-Guang et al., "A Steganalysis Method Based on the Distribution of Space Characters," 2006 International Conference on Communications, and Circuit Systems, Jun. 1, 2006, pp. 54-56. (Abstract Only Provided).
Alizadeh F. et al., "Using Steganography to hide messages inside PDF files," Jan. 7, 2017, 34 pages.
Johnson et al., "Steganalysis: the investigation of hidden information," Information Technology Conference, Sep. 1998, pp. 113-116. (Abstract Only Provided).
Iman Sedeeq et al., "A Prediction Model Based Approach to Open Space Steganography Detection in HTML Webpages," vol. 10431, 2017, 13 pages.
Lee et al., "A new approach to covert communication via PDF files," Signal Processing, Elsevier Science Publishers, vol. 90, No. 2, Feb. 2010, 1 page. (Abstract Only Provided).
Huang et al., "Detection of Hidden Information in Webpage," FSKD 2007 Proceedings of the Fourth International Conference on Fuzzy Systems and Knowledge Discovery—vol. 04, pp. 317-321, Aug. 24-27, 2007, 1 page. (Abstract Only Provided).

\* cited by examiner

STEGANOGRAPHIC ENCODING DETECTION AND REMEDIATION

TECHNICAL FIELD

Embodiments described herein generally relate to the detection and remediation of a file that has been steganographically encoded.

BACKGROUND ART

Data leak prevention (DLP) solutions are capable of inspecting incoming and outgoing traffic to detect and prevent potential data leaks. One type of DLP solution includes removing sensitive, private, and/or traceable information from metadata fields in the files. Removing such information helps to protect potentially sensitive information as well remove "hidden" data that may have been included in the files' metadata fields.

Although a DLP solution can remove or overwrite data contained in metadata fields of a file, there are other ways in which a data leak can occur. One such case involves Portable Document Format (PDF) files that are re-encoded to conceal hidden information in the body of the document using a null space coding steganographic technique. As PDF files are a widely-used format for corporate environments, as well as for individuals, they provide an ideal communication channel for cybercriminals.

DESCRIPTION OF EMBODIMENTS

In the following description, for purposes of explanation, numerous specific details are set forth in order to provide a thorough understanding of the disclosed subject matter. However, the principles described herein can be practiced without these specific details. In other instances, structure and devices are shown in block diagram form for clarity. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter; resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computer resource" or "computer system" refers to a computer with a single processor executing machine instructions, a computer with multiple processors executing machine instructions, or multiple computers each executing a copy of the machine instructions or different portions of the machine instructions.

Figure 1A:
FIG. 1A includes an example of a text string in a PDF file using a space character to create spaces between words.

FIG. 1A includes an example of a text string in a PDF file using a space character to create spaces between words. In this example the text string is "THE ART OF STEGANOGRAPHY HAS LEAKS." Each letter in this text string is represented as a unique code. In one example, the codes are Unicode characters. FIG. 1A shows what the string of Unicode characters looks like when rendered on an output device such as a display or printer. The spaces between the words, represented in FIG. 1A as a box, represent the Unicode character for a space. In some examples, the space character is hexadecimal 20 (decimal 32). References throughout this disclosure generally refer to hexadecimal values and are annotated with an "h" for clarity.

Figure 1B:
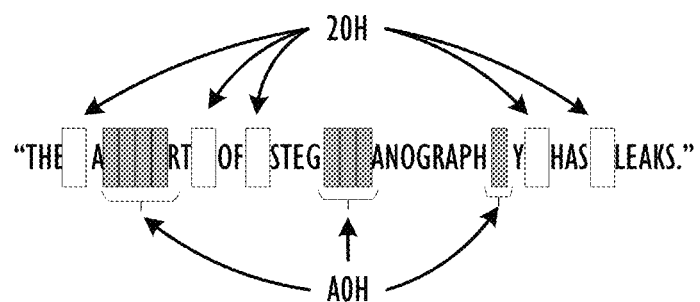
FIG. 1B includes an example of the text string of FIG. 1A using space characters to create spaces between words as well as "invisible" characters, the combination of which defines hidden information.

FIG. 1B shows another example of the text string "THE ART OF STEGANOGRAPHY HAS LEAKS." When rendered, the text string of FIG. 1B will look the same as the text string of FIG. 1A. In addition to the 20h space characters between the words of the text string of FIG. 1B, this text string has been steganographically encoded with multiple invisible characters shown as gray boxes. In this example, each invisible character is the Unicode character A0h. Character A0h can have a width specified to be 0 or greater. When the width of A0h is specified in a file to be 0, the A0h character causes the renderer to avoid dividing the word associated with the A0h character across line boundaries, and thus is referred to as a non-breaking character. For example, if the word "steganographically" were to potentially be rendered at the end of a line with the renderer rendering a first portion of the word at the end of the line and the remaining portion of the word at the beginning of the next line, the A0h character will preclude the renderer from splitting the word in that manner. With a zero width, the A0h is not a displayable character and can be used to steganographically encode a file. In the example of FIG. 1B, four consecutive instances of A0h are included in the text string between the "a" and the "r" of the word "art." Further, three consecutive instances of A0h are included in the text string between the "g" and the "a" of the word "steganographically." Finally, a single instance of the A0h character has been included between the "h" and the "y" of "steganographically."

None of the eight instances of the A0h character are renderable and thus cannot be seen when the text string is displayed or printed. However, the meaning of the A0h characters may encode hidden information. For example, the number of consecutive instances of the A0h character may specify a particular alphanumeric character. By way of an example, four consecutive instance of A0h may represent the letter "a", while three consecutive instance of A0h may represent the letter "r", and a single instance of A0h may represent the letter "e". Thus, in this particular example, the text string has the hidden text string "are". In some cases, the hidden meaning involves a combination of visible characters 20h and hidden characters A0h. Further, although the space character (20h) and the non-breaking character (A0h with a width of 0) have different functions, with some tweaks these characters can be used indistinctly as 'visible spaces' (by assigning a non-zero width to the A0h character) to steganographically encode a file. For example, the A0h character with a non-zero width functions as a 20h space character but may also represent a steganographic artifact in the file with a meaning only to an entity that understands the steganographic coding used.

The disclose embodiments include a system that detects whether a file has been steganographically encoded. In some embodiments, the system may sanitize the file by obfuscating or removing the steganographic coding. The techniques described herein are applicable to PDF files, but can be extended to other file types. In accordance with an embodiment, the system analyzes the text strings of each page of a document (or at least those pages that have text strings). For a given text string, if more than a threshold number of A0h characters are present, then that text string is considered to be a candidate as having been steganographically encoded. If more than a threshold number of text strings on a given page are determined to be candidates for having been steganographically encoded, then the page and thus the document is determined to have been steganographically encoded. The document can then be sanitized. The disclosed techniques apply to single page documents, or multi-page documents.

Figure 2:
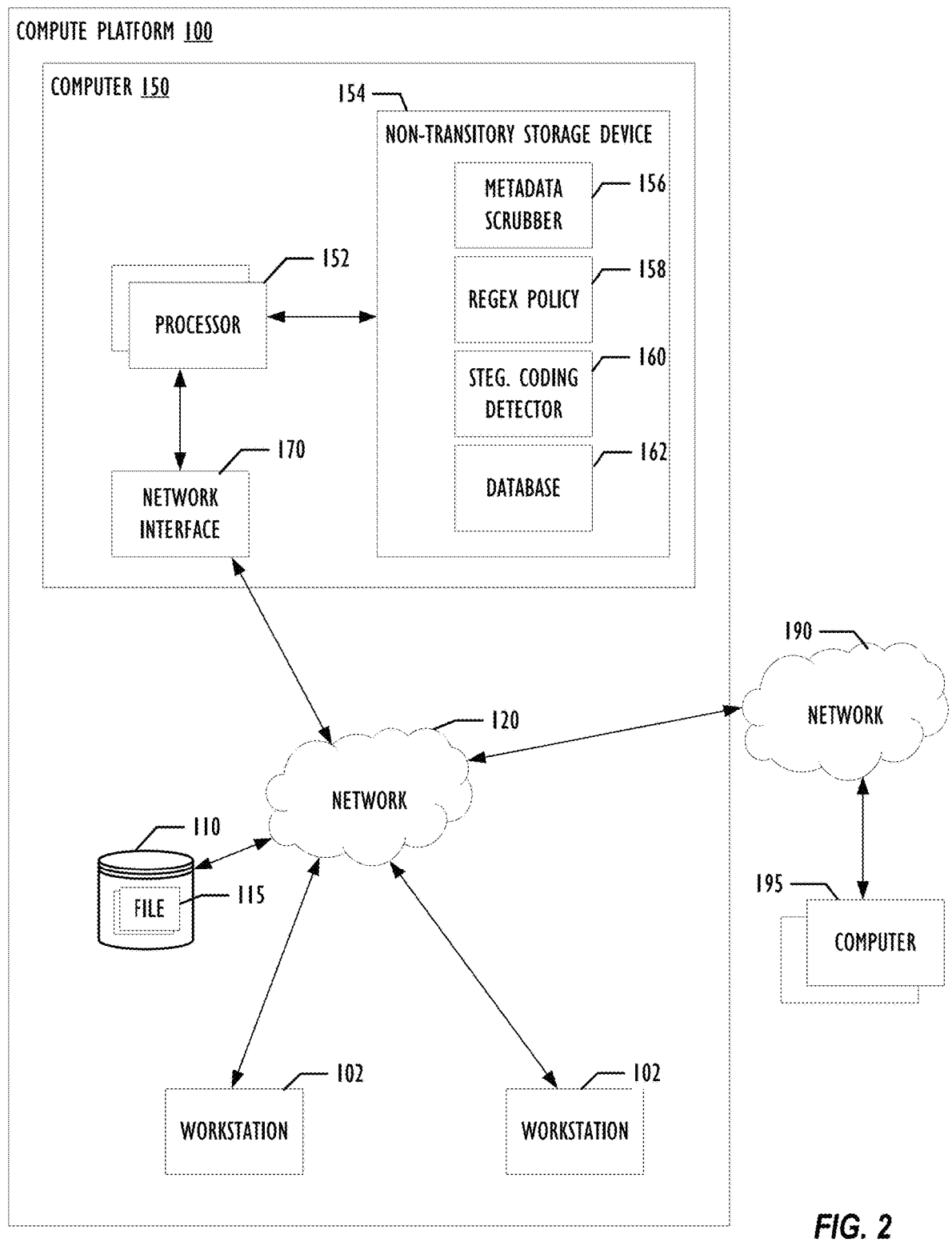
FIG. 2 is a system diagram for implementation of a technique to detect and sanitize files that have been steganographically encoded according to an embodiment.

FIG. 2 shows a system according to an embodiment. The system of FIG. 2 includes a compute platform 100. The compute platform 100 includes an internal network 120 which provides communication between and among one or more workstations 102, storage 110 and a computer 150. The compute platform 100 may be usable by a corporate entity and thus the workstations 102 may be used by employees of the corporate entity or by people otherwise permitted to use the compute platform 100. The compute platform 100 may provide access to external computers 195 via a public network 190 (e.g., the Internet). Files may be transmitted from the external computers 195 to the workstations 102, and from the workstations 102 to the external computers 195. Further, files may be exchanged between the workstations 102. Storage 110 may store files (shown as files 115). Any or all of the files (including files 115) may be processed by computer 150 to determine whether the files have been steganographically encoded as described herein.

The workstations 102 may comprise personal computers (desktops, notebooks, etc.), tablet devices, smart phones, or other types of computer devices. Each workstation 102 may include one or processors and memory containing executable machine instructions. The storage 110 may comprise a single storage drive such as a magnetic storage drive (e.g., a hard disk drive), a solid-state storage drive (SSD) or multiple drives. The storage 110 may comprise network-attached storage that is usable by any of the workstations 102 and the computer 150.

The computer 150 includes one or more processor 152, a non-transitory storage device 154, and a network interface 170. The network interface 170 provides network connectivity to the computer 150. The non-transitory storage device 154 may comprise volatile storage (e.g., random access memory) and/or non-volatile storage (magnetic storage, solid-state storage, etc.). Machine instructions are stored on the non-transitory storage device 154 and executed by the processor 152. The computer 150 comprises a computing resource that is usable to perform data leak prevention (DLP) operations. In other embodiments, the computing resource to perform DLP operations may comprise multiple computers 150, such as part of a DLP service implemented on the compute platform 100. The machine instructions stored in non-transitory storage device 154 in this example include metadata scrubber 156, regex policy 158 and steganographic coding detector 160. Different or additional DLP machine instructions may be included as well.

The metadata scrubber 156 processes a file by removing or overwriting some or all of the metadata fields of the file. The regex policy 158 attempts to find explicit matches using predefined policies such as removing personal identifiable information from documents (credit card numbers, SSNs, etc.) or enforcing a strict classification to documents containing codenames or financial data. Other DLP processing software may be executed as well on computer 150.

The steganographic coding detector 160 analyzes the text strings of a file as noted above. That is, the steganographic coding detector 160 analyzes the text strings of each page of a document. For a given text string, if more than a threshold number of A0h characters are present, then that text string is considered to be a candidate as having been steganographically encoded. If more than a threshold number of text strings on a given page are determined to be candidates for having been steganographically encoded, then the page and thus the document is determined by the steganographic coding detector 160 to have been steganographically encoded. The steganographic coding detector 160 can then sanitize the document.

In the context of a corporate entity, some or all of the files incoming to the compute platform 100 from, for example, external computers 195 are analyzed by the suite of DLP software tools comprising in this example, the metadata scrubber 156, regex policy 158, and the steganographic coding detector 160. Further, some or all of the files outgoing from the compute platform 100 destined for an external computer 195 also may be processed in this manner. The DLP analysis of such files may be triggered by a corporate email program that executes on computer 150 or another computer within the compute platform 100. When an email, containing a PDF file as an attachment, is sent or received, the email program may make an application program interface (API) call to activate execution of the steganographic coding detector 160.

In other embodiments, the functionality of the steganographic coding detector 160 may be part of a PDF reader, a PDF writer, or other type of PDF rendering application. For example, before a PDF file can be rendered on an output device (e.g., a display, printer, etc.), the file is processed as described herein.

The steganographic coding detector 160 operates on PDF files in the disclosed examples. The PDF files may be transmitted between the workstations 102 or between a workstation 102 and an external computer 195. During transit, the file can be processed by the steganographic coding detector 160 before its transmission is completed. Further, the steganographic coding detector 160 may receive files 115 from storage 110 to process as described herein.

If a file is determined to be steganographically encoded, then the file can be marked for remediation. Marking a file may include tagging the file with metadata identifying it as having been steganographically encoded. Marking a file alternatively or additionally may include adding a record to database 162 identifying the file as having been steganographically encoded. Examples of how a file determined to be steganographically encoded can be remediated are described below.

Figure 3:
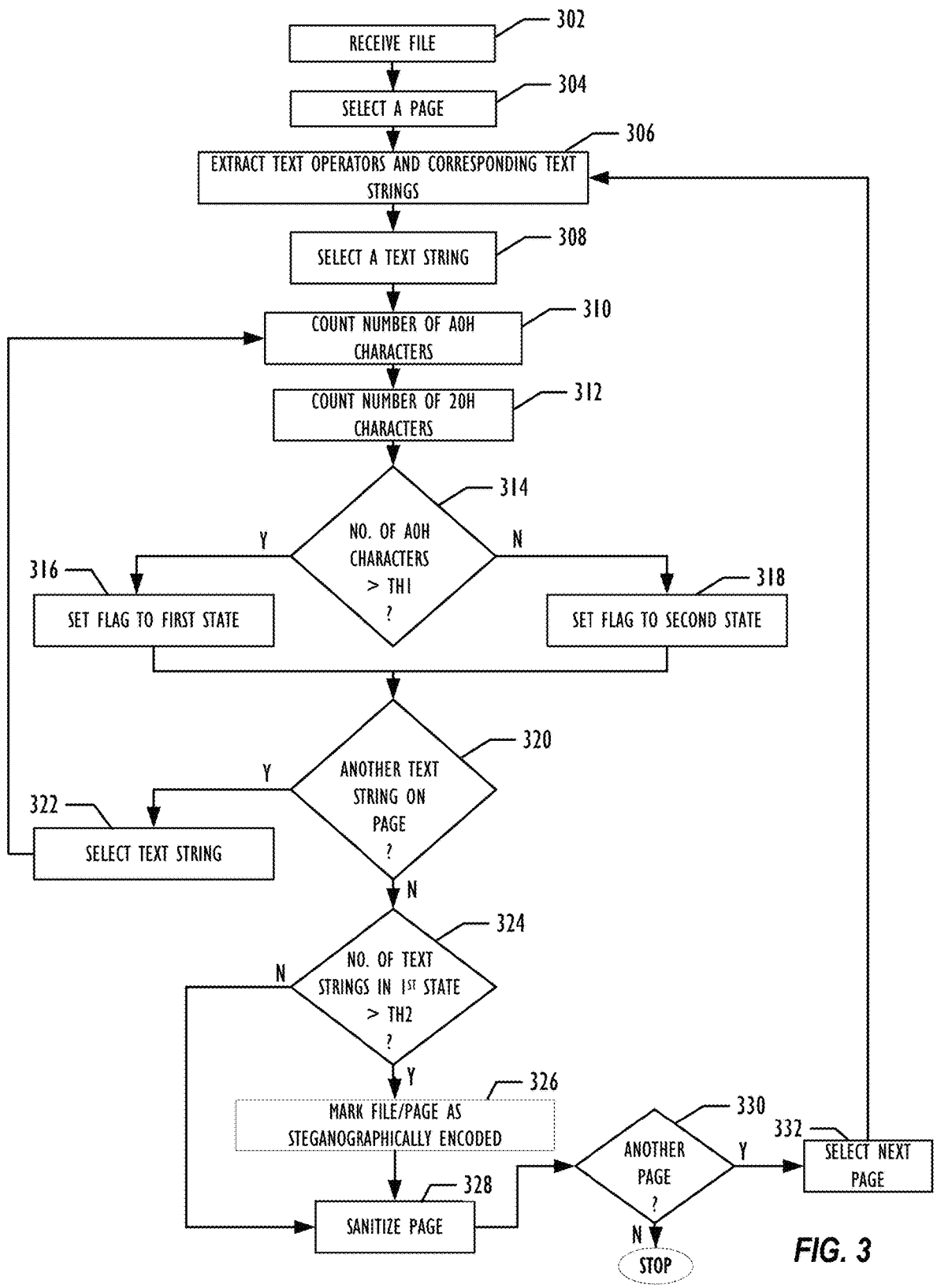
FIG. 3 shows a method for detecting and sanitizing a document that has been steganographically encoded according to an embodiment.

FIG. 3 shows an example of a method implemented by the computer 150, upon execution by processor(s) 152 or other computing resources of the steganographic coding detector 160. The operations may be performed in the order shown, or in a different order. Further, the operations may be sequentially, or two or more of the operations may be performed concurrently.

At 302, the method includes receiving a file. Receipt of the file may include retrieving a file 115 from storage 110, receipt of a file to be transmitted from one computer device to another (e.g., between workstations 102, between a workstation 102 and external computer 195, receipt from a workstation 102 before the file is stored in storage 110, etc.). The steganographic coding detector 160 may operate in a background mode in which the steganographic coding detector 160 periodically or continuously retrieves files 115 that have not already been processed by the steganographic coding detector 160. An email program may provide a file to the steganographic coding detector 160 for analysis or provide an identifier to the steganographic coding detector 160 of a location at which a file is located that is to be processed by the steganographic coding detector 160 before the file is transmitted as an attachment to an email or before the email with an attached file can be saved and provided to the recipient of the email.

Figure 4:
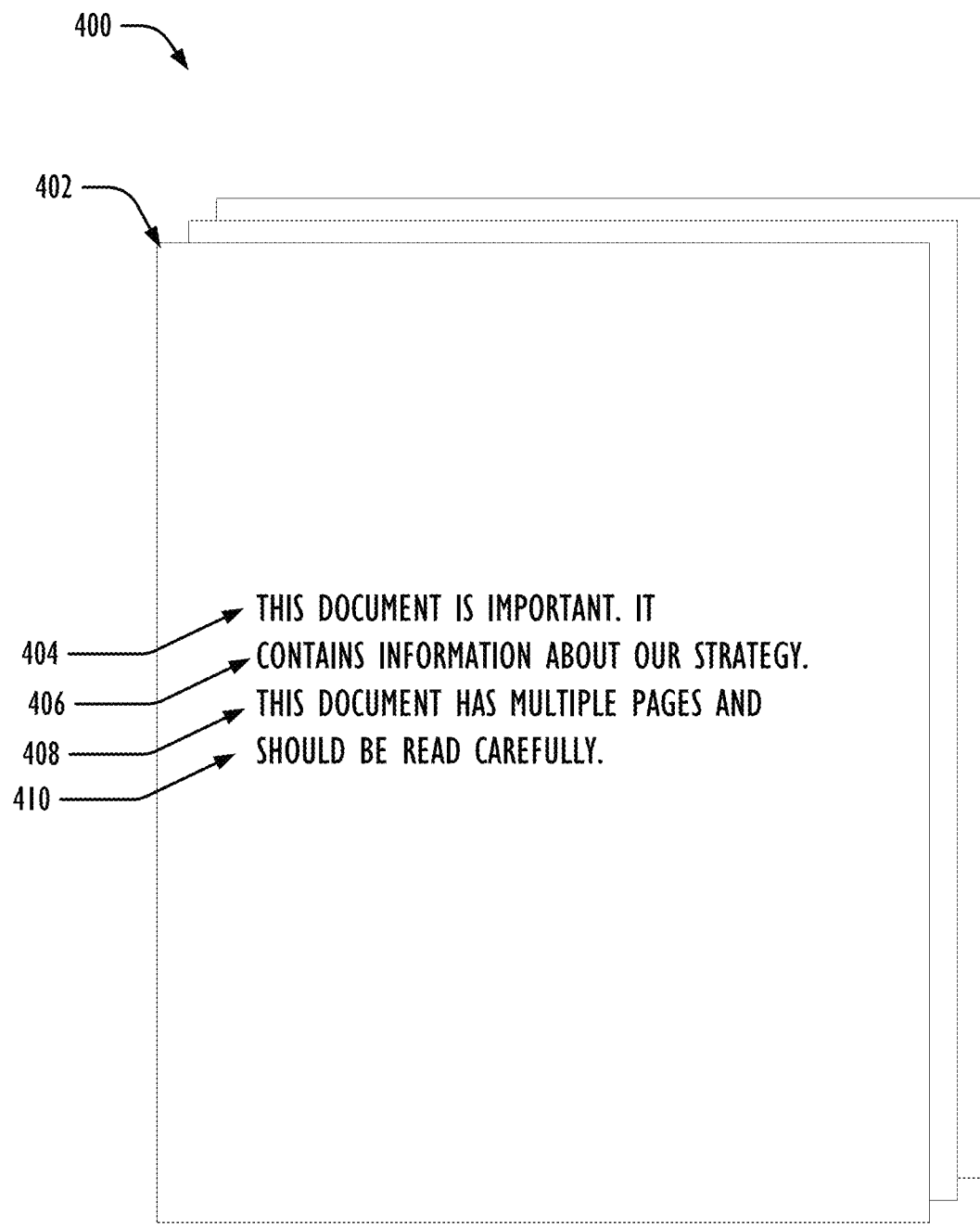
FIG. 4 shows multiple pages of a document containing text strings to be analyzed for steganographic coding according to an embodiment.

The file received at 302 may contain one or more pages, and one or more of the pages may include text strings. An example of a multi-page file 400 is shown in FIG. 4. The file 400 includes multiple pages 402 with text on at least one of the pages 402. The text strings rendered as text on a given page may span multiple lines on the page. As a PDF, the text strings are encoded in the file 400 with a [TJ] or [Tj] text operator. Each text operator identifies a text string to be rendered by the rendering program on an output device. The text string is included adjacent the text operator in the file in parentheses. For example, the first line 404 of the text on the top page 402 shown in the example of FIG. 4 is encoded in the file 400 as

TJ (THIS DOCUMENT IS IMPORTANT. IT)

Other operators in the file may specify where on the rendered output page the text is to be shown, the font, the point size, etc. Each line 404, 406, 408, and 410 may have its own text operator and corresponding text string. The text string of any given text operator may be rendered across line boundaries as noted above. Further, any given text string may be steganographically encoded.

At 304, the steganographic coding detector 160 selects a page within the file received at 302. In the case of a file that only has one page, the steganographic coding detector 160 selects that page. In the case of a file that contains multiple pages, the steganographic coding detector 160 may select the first page to be rendered for analysis, although the order at which the pages are analyzed can be different than first to last (e.g., the order can be last page to first page, or another order).

At 306, the method includes extracting text operators and their corresponding text strings from the selected page. The extracted text strings may be stored in temporary storage (e.g., random access memory within the computing resource performing the method. As noted above, each text string corresponds to a text operator in the file. Thus, operation 306 may include analyzing the page for text operators (e.g., [TJ], [Tj]), and extracting the corresponding text string upon detection of a text operator. In some embodiments, all of the text strings corresponding to all text operators on the selected page are extracted from the file at 306. At 308, the method includes selecting a text string from the extracted text strings for further analysis.

At 310, the method includes counting the number of A0h Unicodes, if any, within the selected text string. In the example of FIG. 1B, eight A0h characters would have been counted in the text string. At 312, the method also includes counting the number of 20h Unicodes, if any, within the selected text string. In the example of FIG. 1B, five 20h characters would have been counted in the text string.

At 314, the method includes determining whether the number of A0h characters is greater than a first threshold (TH1). The first threshold is computed by the steganographic coding detector 160 based on the number of 20h space characters in the text string. In one example, the first threshold is computed by the steganographic coding detector 160 as the number of 20h characters in the text string plus 1. The number of 20h characters plus 1 typically equals the number of words in the text string, and thus the first threshold will equal to the number of words in this example. As noted above, a zero width A0h character can be used to specify that a given word is not to be split across line boundaries by the rendering program. A line of text in a document typically has at most one or two A0h characters, although more than two A0h characters is legitimately possible. However, a line of text in a file that has more A0h characters than the number of 20h space characters plus 1 has likely been steganographically encoded. The first threshold (TH1) can be computed to be a value other than the number of 20h characters plus 1 in other embodiments. By varying the size of the first threshold, a trade-off can be made between accurate detection of all text lines that have been steganographically encoded and the assertion of false positives (i.e., incorrectly determining a line of text to have steganographically encoded). By setting the first threshold at the number of 20h characters plus 1, the likelihood will be high that any line of text detected as possibly having been steganographically encoded was truly steganographically encoded, but at the expense of failing to detect lines of text that have been steganographically encoded but for which the number of A0h characters was not large enough to exceed the number of 20h characters plus 1. If increased tolerance of some false positives is acceptable in a given example, then the value of the first threshold can be reduced to, for example, the number of 20h characters, or even lower.

If the number of A0h characters exceeds the first threshold, then at 316, the method includes setting a flag for that character string to a first state. Otherwise, at 318, the flag is set to a second state. The first state signifies that the text string has likely been steganographically encoded and the second state signifies that the text string has likely not been steganographically encoded. In one example, the first state may be a value of 0 and the second state may be a value of 1, although other values may be used for the first and second states.

At 320, the method includes determining whether an additional text string is present on the page selected at 304. Other text strings are identified by text operators (e.g., [TJ], [Tj]) as explained above with regard to operation 306. If another text string is present on the page, then that text string is selected at 322 (similar to how the initial text string was selected at 308), and control continues at operation 310 to analyze the newly selected text string as described above. The flag set to the first or second states at 316, 318 is specific to each text string on the page. If a page has four text strings, then the illustrative method of FIG. 3 will have set four flags—one flag for each text string.

Once all of the text strings on a given page of the file have been analyzed as possibly having been steganographically encoded, then control passes to decision 324. At 324, the method determines whether the number of text strings on the page whose flags have been set to the first state (likely steganographically encoded) exceeds a second threshold (TH2). In some implementations, the second threshold is a preset value (e.g., 1, 2, 3, 4, etc.). In other implementations, the steganographic coding detector 160 computes the second threshold based on the number of text operators found on the page, for example, a percentage of the number of text operators found on the page. In one example, the percentage is 40% meaning that the second threshold (TH2) is 40% of the text operators on the page. If there are 20 text operators for a given page, then the second threshold will be computed as 8 for that page (40% of 20).

If the number of text strings with flags set to the first state exceeds the second threshold, then the page (and thus the file containing the page) is marked as being steganographically encoded at 326. Marking a file as being steganographically encoded may include adding a record to database 162, adding metadata to the file designating the file as being steganographically encoded, etc.

A remediation action then may be performed on the page. The example of FIG. 3 illustrates page sanitization at 328 as one type of remediation action. In one example, sanitization may include determining the width value for the A0h characters for the file. In a PDF file, the default width of the A0h character is 0, but the width can be set to an integer greater than 0 if desired. An operating code within the PDF file is included to thereby set the width of the A0h character to a non-zero value. The width of the A0h character may be set through the font definition used in PDF files. If that particular operating code is missing, the steganographic coding detector 160 determines the width of the A0h characters for the file to be 0. The sanitization process at 328 also may include removing one or more A0h characters from each text string whose flag was set to the first state. In some cases, all A0h characters are removed from such text strings.

Referring still to the sanitization process at 328, if the width of the A0h characters is determined to be greater than 0, then the steganographic coding detector 160 replaces at least one (and, in some embodiments, all) of the A0h characters of each text string whose flag was set to the first state with a 20h space character. An A0h character with a non-zero width is rendered as a visible space (the size of the space being a function of the value of the width). Thus, by replacing A0h characters with non-zero widths with 20h space characters, the renderer will still render a space so the resulting output image will be approximately the same as would have been the case with the A0h characters, but the A0h characters forming a part of the hidden information on the page has been removed. Another example of a remediation action is to generate an alert (e.g., a text message, email, etc.) to a network manager for the compute platform 100.

At 330, the method determines whether an additional page of the file remains to be analyzed. If there are no more pages, then the process ends. Otherwise, the next page in the file is selected at 332, and control loops back to operation 306 to analyze the newly selected page as described above.

Figure 5:
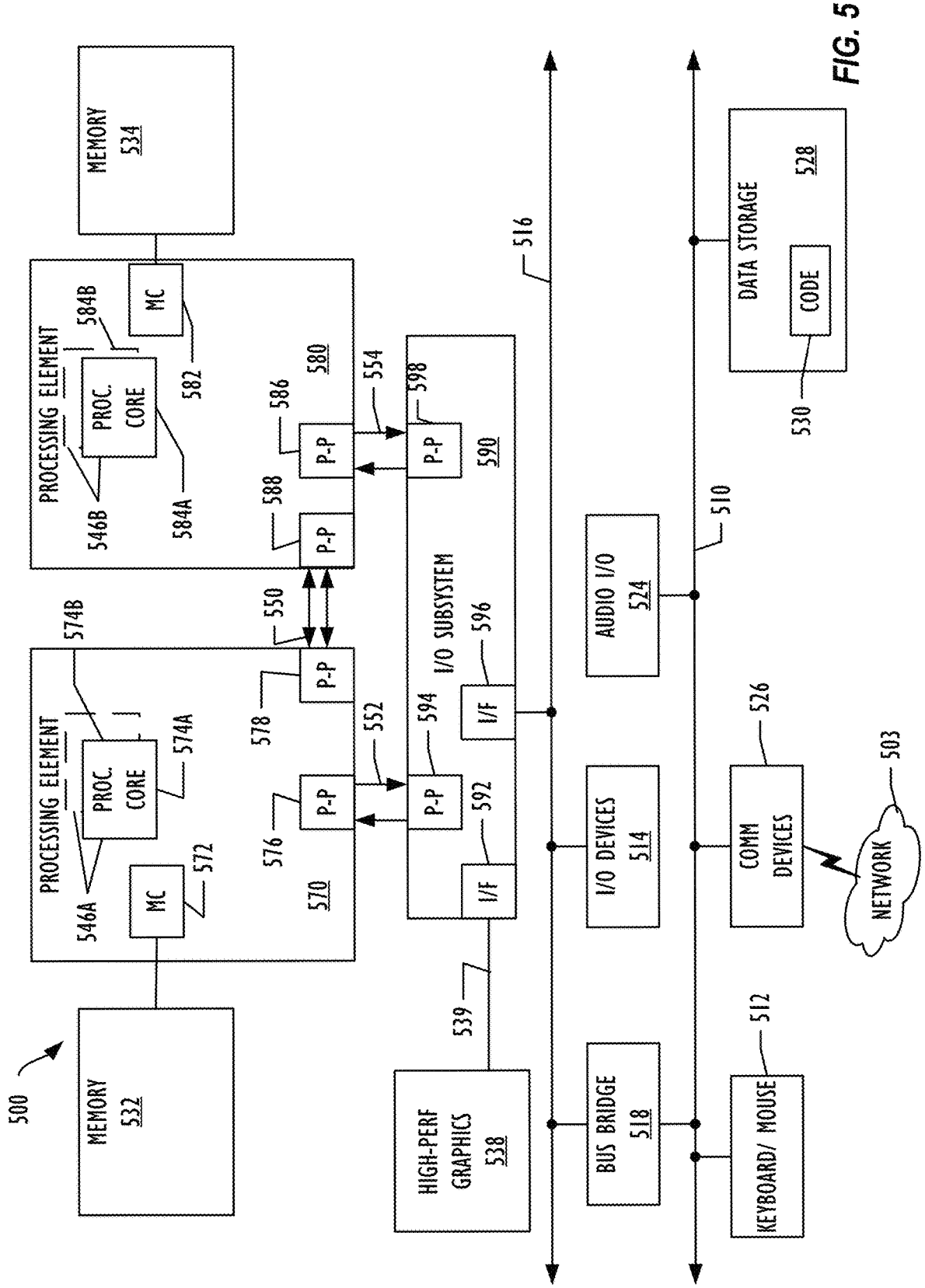
FIG. 5 is a block diagram illustrating a computing device for use with techniques as described herein according to one embodiment.
Figure 6:
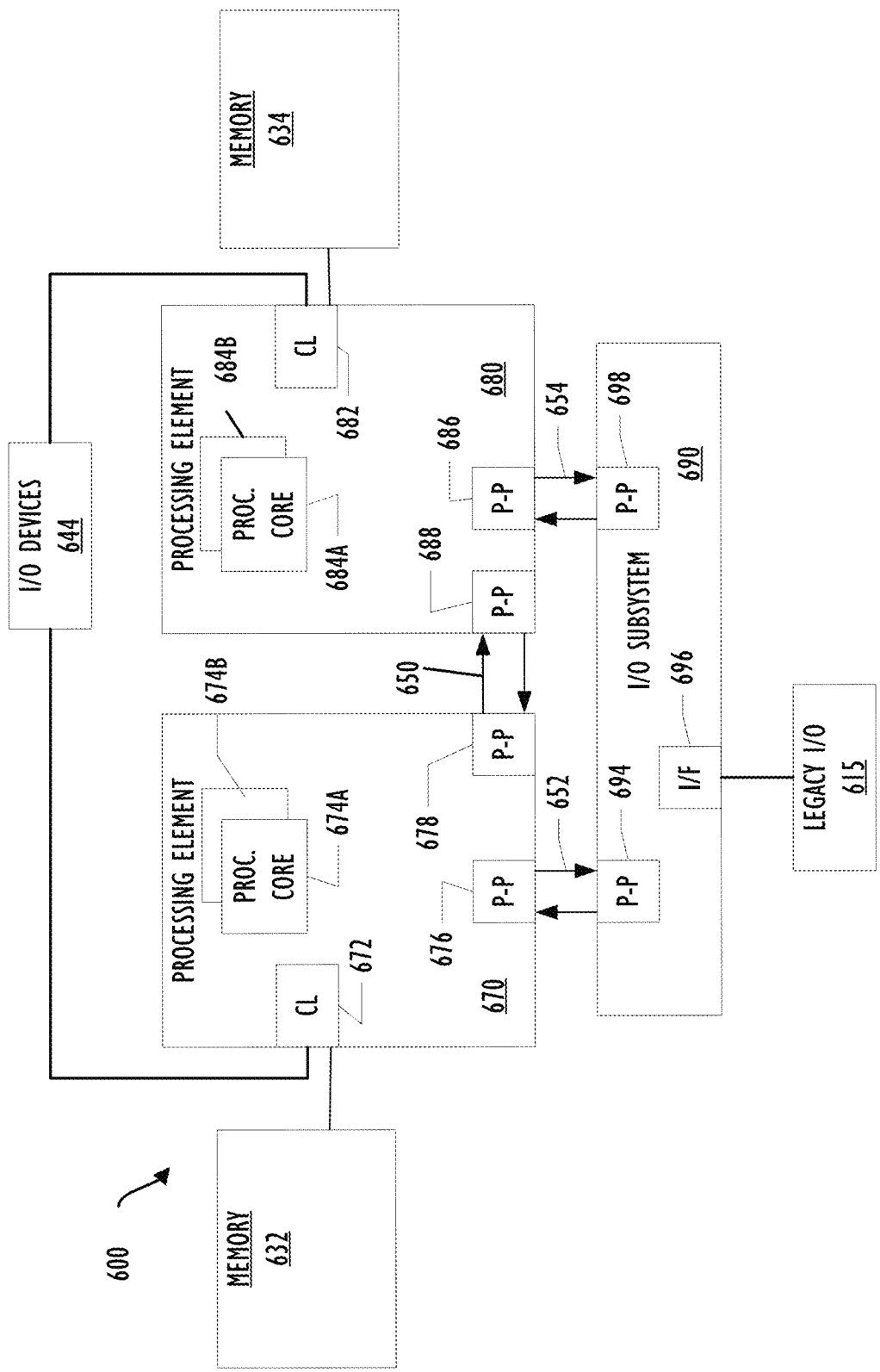
FIG. 6 is a block diagram illustrating a network according to one embodiment.

FIGS. 5 and 6 comprise examples of computing resources for implementation of the steganographic coding detector 160. Referring now to FIG. 5, a block diagram illustrates a programmable device 500 that may be used for implementing the techniques described herein in accordance with one embodiment. The programmable device 500 illustrated in FIG. 5 is a multiprocessor programmable device that includes a first processing element 570 and a second processing element 580. While two processing elements 570 and 580 are shown, an embodiment of programmable device 500 may also include only one such processing element.

Programmable device 500 is illustrated as a point-to-point interconnect system, in which the first processing element 570 and second processing element 580 are coupled via a point-to-point interconnect 550. Any or all of the interconnects illustrated in FIG. 5 may be implemented as a multi-drop bus rather than point-to-point interconnects.

As illustrated in FIG. 5, each of processing elements 570 and 580 may be multicore processors, including first and second processor cores (i.e., processor cores 574a and 574b and processor cores 584a and 584b). Such cores 574a, 574b, 584a, 584b may be configured to execute instruction code. However, other embodiments may use processing elements that are single core processors as desired. In embodiments with multiple processing elements 570, 580, each processing element may be implemented with different numbers of cores as desired.

Each processing element 570, 580 may include at least one shared cache 546. The shared cache 546a, 546b may store data (e.g., instructions) that are utilized by one or more components of the processing element, such as the cores 574a, 574b and 584a, 584b, respectively. For example, the shared cache may locally cache data stored in a memory 532, 534 for faster access by components of the processing elements 570, 580. In one or more embodiments, the shared cache 546a, 546b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 570, 580 for clarity of the drawing, the scope of the present invention is not so limited and any number of processing elements may be present. Alternatively, one or more of processing elements 570, 580 may be an element other than a processor, such as an graphics processing unit (GPU), a digital signal processing (DSP) unit, a field programmable gate array, or any other programmable processing element. Processing element 580 may be heterogeneous or asymmetric to processing element 570. There may be a variety of differences between processing elements 570, 580 in terms of a spectrum of metrics of merit including architectural, microarchitectural, thermal, power consumption characteristics, and the like. These differences may effectively manifest themselves as asymmetry and heterogeneity amongst processing elements 570, 580. In some embodiments, the various processing elements 570, 580 may reside in the same die package.

First processing element 570 may further include memory controller logic (MC) 572 and point-to-point (P-P) interconnects 576 and 578. Similarly, second processing element 580 may include a MC 582 and P-P interconnects 586 and 588. As illustrated in FIG. 5, MCs 572 and 582 couple processing elements 570, 580 to respective memories, namely a memory 532 and a memory 534, which may be portions of main memory locally attached to the respective processors. While MC logic 572 and 582 is illustrated as integrated into processing elements 570, 580, in some embodiments the memory controller logic may be discrete logic outside processing elements 570, 580 rather than integrated therein.

Processing element 570 and processing element 580 may be coupled to an I/O subsystem 590 via respective P-P interconnects 576 and 586 through links 552 and 554. As illustrated in FIG. 5, I/O subsystem 590 includes P-P interconnects 594 and 598. Furthermore, I/O subsystem 590 includes an interface 592 to couple I/O subsystem 590 with a high performance graphics engine 538. In one embodiment, a bus (not shown) may be used to couple graphics engine 538 to I/O subsystem 590. Alternately, a point-to-point interconnect 539 may couple these components.

In turn, I/O subsystem 590 may be coupled to a first link 516 via an interface 596. In one embodiment, first link 516 may be a Peripheral Component Interconnect (PCI) bus, or a bus such as a PCI Express bus or another I/O interconnect bus, although the scope of the present invention is not so limited.

As illustrated in FIG. 5, various I/O devices 514, 524 may be coupled to first link 516, along with a bridge 518 that may couple first link 516 to a second link 520. In one embodiment, second link 520 may be a low pin count (LPC) bus. Various devices may be coupled to second link 520 including, for example, a keyboard/mouse 512, communication device(s) 526 (which may in turn be in communication with the computer network 503), and a data storage unit 528 such as a disk drive or other mass storage device which may include code 530, in one embodiment. The code 530 may include instructions for performing embodiments of one or more of the techniques described above. Further, an audio I/O 524 may be coupled to second link 520.

Note that other embodiments are contemplated. For example, instead of the point-to-point architecture of FIG. 5, a system may implement a multi-drop bus or another such communication topology. Although links 516 and 520 are illustrated as busses in FIG. 5, any desired type of link may be used. In addition, the elements of FIG. 5 may alternatively be partitioned using more or fewer integrated chips than illustrated in FIG. 5.

Referring now to FIG. 6, a block diagram illustrates a programmable device 600 according to another embodiment. Certain aspects of FIG. 6 have been omitted from FIG. 6 in order to avoid obscuring other aspects of FIG. 6.

FIG. 6 illustrates that processing elements 670, 680 may include integrated memory and I/O control logic ("CL") 672 and 682, respectively. In some embodiments, the 672, 682 may include memory control logic (MC) such as that described above in connection with FIG. 5. In addition, CL 672, 682 may also include I/O control logic. FIG. 6 illustrates that not only may the memories 632, 634 be coupled to the CL 672, 682, but also that I/O devices 644 may also be coupled to the control logic 672, 682. Legacy I/O devices 615 may be coupled to the I/O subsystem 690 by interface 696. Each processing element 670, 680 may include multiple processor cores, illustrated in FIG. 6 as processor cores 674A, 674B, 684A and 684B. As illustrated in FIG. 6, I/O subsystem 690 includes point-to-point (P-P) interconnects 694 and 698 that connect to P-P interconnects 676 and 686 of the processing elements 670 and 680 with links 652 and 654. Processing elements 670 and 680 may also be interconnected by link 650 and interconnects 678 and 688, respectively.

The programmable devices depicted in FIGS. 5 and 6 are schematic illustrations of embodiments of programmable devices that may be utilized to implement various embodiments discussed herein. Various components of the programmable devices depicted in FIGS. 5 and 6 may be combined in a system-on-a-chip (SoC) architecture.

EXAMPLES

The following examples pertain to further embodiments.

Example 1 is a non-transitory storage device storing machine instructions, wherein the machine instructions, when executed by a computing resource, cause the computing resource to receive a file containing a page that includes multiple text operators, wherein each text operator corresponds to a text string. For the page, the computing resource is also caused to count a number of A0h characters for the text string corresponding to each text operator and count a number of 20h characters for the text string corresponding to each text operator. For each text string for which the number of A0h characters is greater than a first threshold, the computing resource is caused to set a flag for that text string to a first state, The first threshold is computed based on the number of 20h characters in that text string. For each text string for which the number of 20h characters is less than the first threshold, the computing resource is caused to set the flag for that text string to a second state. Responsive to the number of text strings that have a flag at the first state being greater than a second threshold, the computing resource is caused mark the file as being steganographically encoded.

In Example 2, the subject matter of Example 1 can optionally include the machine instructions causing the computing resource to compute the first threshold for a given text string as the number of 20h characters in that text string plus 1.

In Example 3, the subject matter of any one of Examples 1-2 can optionally include the computing resource to compute the second threshold based on a number of text operators on the page.

In Example 4, the subject matter of any one of Examples 1-3 can optionally include the second threshold being a preset value.

In Example 5, the subject matter of any of Examples 1-4 can optionally include the machine instructions causing the computing resource to perform a remediation action on the file.

In Example 6, the subject matter of Example 5 can optionally include the machine instructions to cause the computing resource to perform the remediation action through determination of a width value of the A0h characters in the file to be 0 and removal of at least one A0h characters of each text string having a flag set to the first state.

In Example 7, the subject matter of Example 5 can optionally include the machine instructions to cause the computing resource to perform the remediation action through determination of a width value of the A0h characters in the file to be 0 and removal of all A0h characters of each text string having a flag set to the first state.

In Example 8, the subject matter of Example 5 can optionally include the machine instructions to cause the computing resource to perform the remediation action through determination of a width value of the A0h characters in the file to be greater than 0 and replacement of at least one A0h character of each text string having a flag set to the first state with a 20h character.

In Example 9, the subject matter of Example 5 can optionally include the machine instructions to cause the computing resource to perform the remediation action through determination of a width value of the A0h characters in the file to be greater than 0 and replacement of each A0h character of each text string having a flag set to the first state with a 20h character.

In Example 10 in which the received file contains a plurality of pages, with at last two of the pages containing multiple text operators, the subject matter of any of Examples 1-9 can optionally include the machine instructions to cause the computing resource to: for each page having multiple text operators, count the number of A0h characters for the text string corresponding to each text operator, for each page having multiple text operators, count the number of 20h characters for the text string corresponding to each text operator, for each text string on each page for which the number of A0h characters is greater than the first threshold, set the flag for that text string to the first state, for each text string on each page for which the number of A0h characters is less than the first threshold, set the flag for that text string to the second state, and for each page having multiple text operators, determine whether the number of text strings with a flag at the first state is in excess of the second threshold.

In Example 11, the subject matter of any one of Examples 1-10 can optionally include that the file is a PDF.

Example 12 is a method to determine whether a file containing a plurality of text operators for identifying text strings is steganographically encoded. The method of Example 12 includes counting a number of A0h characters and a number of 20h characters for each text string corresponding to a text operator. For each text string for which the number of A0h characters is greater than a first threshold, wherein the first threshold is based on the number of 20h characters in that text string, the method of Example 12 includes identifying the text string as a candidate for being steganographically encoded. Responsive to the number of text strings identified as candidates for being steganographically encoded being greater than a second threshold, the method includes sanitizing the file.

In Example 13, the subject matter of Example 12 can optionally include sanitizing the file by determining a width value of the A0h characters to be 0 and removing all A0h characters of each text string identified as a candidate for being steganographically encoded.

In Example 14, the subject matter of Example 12 can optionally include sanitizing the file by determining a width value of the A0h characters in the file to be greater than 0 and replacing each A0h character of each text string identified as a candidate for being steganographically encoded with a 20h character.

In Example 15, the subject matter of any of Examples 12-14 can optionally include computing the first threshold for a given text string as the number of 20h characters in that text string plus 1.

In Example 16, the subject matter of any of Examples 12-15 can optionally include counting the number of text operators on a page of the file and computing the second threshold based on the counted number of text operators.

Example 17 is a system to detect a steganographically encoded file that includes a network interface and one or more processors coupled to the network interface. The one or more processors are configured to receive a file containing a page that includes multiple text operators, wherein each text operator corresponds to a text string; count a number of instances of a first character within the text string corresponding to each text operator, count a number of instances of a second character within the text string corresponding to each text operator, for each text string for which the number of first characters is greater than a first threshold, set a flag for that text string to a first state, and responsive to the number of text strings that have a flag at the first state being greater than a second threshold, identify the file as being steganographically encoded.

In Example 18, the subject matter of Example 17 optionally include the one or more processors being configured to determine a width value of the first characters to be 0 and remove at least one first character of each text string whose flag is set to the first state.

In Example 19, the subject matter of Example 17 optionally include the one or more processors being configured to determine a width value of the first characters to be greater than 0 and replace at least one first character of each text string whose flag is set to the first state with a second character.

In Example 20, the subject matter of Examples 17-19 optionally include the one or more processors being configured to compute the first threshold for a given text string based on the number of second characters in that text string.

In Example 21, the subject matter of Examples 17-19 optionally include the one or more processors being configured to compute the first threshold for a given text string as the number of second characters in that text string plus 1.

In Example 22, the subject matter of Examples 17-21 optionally include that the second character is a space character.

In Example 23, the subject matter of Examples 17-21 optionally include that the first character is a A0h Unicode character and the second character is a 20h Unicode character.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory storage device storing machine instructions, wherein the machine instructions, when executed by a computing resource, cause the computing resource to:
    receive a file containing a page that includes multiple text operators, wherein each text operator corresponds to a text string; and
    for the page:
        count a number of A0h characters for the text string corresponding to each text operator;
        count a number of 20h characters for the text string corresponding to each text operator;
        for each text string for which the number of A0h characters is greater than a first threshold, wherein the first threshold is computed as the number of 20h characters in that text string plus one, set a flag for that text string to a first state;
        for each text string for which the number of A0h characters is less than the first threshold, set a flag for that text string to a second state; and
        responsive to the number of text strings that have a flag at the first state being greater than a second threshold, mark the file as being steganographically encoded.

2. The non-transitory storage device of claim 1, wherein the machine instructions, when executed by the computing resource, cause the computing resource to compute the second threshold based on a number of text operators on the page.

3. The non-transitory storage device of claim 1, wherein the second threshold is a preset value.

4. The non-transitory storage device of claim 1, wherein the machine instructions, when executed by the computing resource, cause the computing resource to perform a remediation action on the file.

5. The non-transitory storage device of claim 4, wherein the machine instructions, when executed by the computing resource, cause the computing resource to perform the remediation action through:
determination of a width value of the A0h characters in the file to be 0; and
removal of at least one A0h character of each text string having a flag set to the first state.

6. The non-transitory storage device of claim 4, wherein the machine instructions, when executed by the computing resource, cause the computing resource to perform the remediation through:
determination of a width value of the A0h characters in the file to be 0; and
removal of all A0h characters of each text string having a flag set to the first state.

7. The non-transitory storage device of claim 4, wherein the machine instructions, when executed by the computing resource, cause the computing resource to perform the remediation through:
determination of a width value of the A0h characters in the file to be greater than 0; and
replacement of at least one A0h character of each text string having a flag set to the first state with a 20h character.

8. The non-transitory storage device of claim 4, wherein the machine instructions, when executed by the computing resource, cause the computing resource to perform the remediation through:
determination of a width value of the A0h characters in the file to be greater than 0; and
replacement of each A0h character of each text string having a flag set to the first state with a 20h character.

9. The non-transitory storage device of claim 1, wherein the received file contains a plurality of pages, with at last two of the pages containing multiple text operators, and wherein, when executed, the machine instructions cause the computing resource to:
for each page having multiple text operators, count the number of A0h characters for the text string corresponding to each text operator;
for each page having multiple text operators, count the number of 20h characters for the text string corresponding to each text operator;
for each text string on each page for which the number of A0h characters is greater than the first threshold, set the flag for that text string to the first state;
for each text string on each page for which the number of A0h characters is less than the first threshold, set the flag for that text string to the second state; and
for each page having multiple text operators, determine whether the number of text strings with a flag at the first state is in excess of the second threshold.

10. The non-transitory storage device of claim 1, wherein the file is a portable document format (PDF).

11. A method to determine whether a file containing a plurality of text operators for identifying text strings is steganographically encoded, comprising:
counting a number of A0h characters and a number of 20h characters for each text string corresponding to a text operator;
for each text string for which the number of A0h characters is greater than a first threshold, wherein the first threshold is computed as the number of 20h characters in that text string plus one, identifying the text string as a candidate for being steganographically encoded; and
responsive to the number of text strings identified as candidates for being steganographically encoded being greater than a second threshold, sanitizing the file.

12. The method of claim 11, wherein sanitizing the file comprises:
determining a width value of the A0h characters to be 0; and
removing all A0h characters of each text string identified as a candidate for being steganographically encoded.

13. The method of claim 11, wherein sanitizing the file comprises:
determining a width value of the A0h characters in the file to be greater than 0; and
replacing each A0h character of each text string identified as a candidate for being steganographically encoded with a 20h character.

14. The method of claim 11, further comprising:
counting the number of text operators on a page of the file; and
computing the second threshold based on the counted number of text operators.

15. A system to detect a steganographically encoded file, comprising:
a network interface; and
one or more processors coupled to the network interface;
wherein the one or more processors are configured to:
receive a file containing a page that includes multiple text operators, wherein each text operator corresponds to a text string;
count a number of instances of a first character within the text string corresponding to each text operator;
count a number of instances of a second character within the text string corresponding to each text operator;
for each text string for which the number of first characters is greater than a first threshold, set a flag for that text string to a first state, wherein the first threshold is computed as the number of 20h characters in that text string plus one; and
responsive to the number of text strings that have a flag at the first state being greater than a second threshold, identify the file as being steganographically encoded.

16. The system of claim 15, wherein the one or more processors are configured to:
determine a width value of the first characters to be 0; and
remove at least one first character of each text string whose flag is set to the first state.

17. The system of claim 15, wherein the one or more processors are configured to:
determine a width value of the first characters to be greater than 0; and
replace at least one first character of each text string whose flag is set to the first state with a second character.

18. The system of claim 15, wherein the second character is a space character.

19. The system of claim 15, wherein the first character is a A0h Unicode character and the second character is a 20h Unicode character.

* * * * *